United States Patent
Nozawa

(10) Patent No.: US 9,300,971 B2
(45) Date of Patent: Mar. 29, 2016

(54) MOVING IMAGE DATA ENCODING APPARATUS CAPABLE OF ENCODING MOVING IMAGES USING AN ENCODING SCHEME IN WHICH A TERMINATION PROCESS IS PERFORMED

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/667,364

(22) PCT Filed: Jun. 23, 2008

(86) PCT No.: PCT/JP2008/061780
§ 371 (c)(1),
(2), (4) Date: Dec. 30, 2009

(87) PCT Pub. No.: WO2009/005018
PCT Pub. Date: Jan. 8, 2009

(65) Prior Publication Data
US 2011/0038417 A1    Feb. 17, 2011

(30) Foreign Application Priority Data

Jul. 3, 2007   (JP) .................................. 2007-175228
Jun. 5, 2008   (JP) .................................. 2008-148327

(51) Int. Cl.
*H04N 19/152* (2014.01)
*H04N 19/105* (2014.01)
*H04N 19/172* (2014.01)
*H04N 19/107* (2014.01)

(52) U.S. Cl.
CPC ........... *H04N 19/152* (2014.11); *H04N 19/105* (2014.11); *H04N 19/107* (2014.11); *H04N 19/172* (2014.11)

(58) Field of Classification Search
None
See application file for complete search history.

(56) References Cited

U.S. PATENT DOCUMENTS

| | | |
|---|---|---|
| 5,146,325 A | 9/1992 | Ng |
| 5,400,076 A | 3/1995 | Iwamura |
| 5,719,646 A | 2/1998 | Kikuchi et al. |
| 6,683,988 B1 | 1/2004 | Fukunaga et al. |
| 2003/0081850 A1* | 5/2003 | Karczewicz et al. ......... 382/247 |
| 2003/0112366 A1* | 6/2003 | Baylon et al. ................. 348/441 |
| 2003/0215012 A1* | 11/2003 | Etoh et al. ................ 375/240.12 |

(Continued)

FOREIGN PATENT DOCUMENTS

| | | |
|---|---|---|
| EP | 0588586 A | 3/1994 |
| JP | 2006-115336 A | 4/2006 |

(Continued)

OTHER PUBLICATIONS

Sep. 17, 2013 Japanese Office Action, that issued in Japanese Patent Application No. 2012-278589, which is a divisional application of the basic Japanese Patent Application, and was not previously cited in a different Official Action.

*Primary Examiner* — William C Vaughn, Jr.
*Assistant Examiner* — Michael J Hess
(74) *Attorney, Agent, or Firm* — Cowan, Liebowitz & Latman, P.C.

(57) ABSTRACT

When encoding moving images using an encoding scheme in which a termination process is performed, controlling so that a picture to be encoded after a picture whose encoding has been forcibly terminated does not refer to the picture whose encoding has been forcibly terminated. By so doing, encoding using a reference picture with low correlation is suppressed and encoding efficiency can be improved.

8 Claims, 7 Drawing Sheets

(56) References Cited

U.S. PATENT DOCUMENTS

| | | | |
|---|---|---|---|
| 2006/0083299 A1 | 4/2006 | Kitajima | |
| 2007/0014364 A1* | 1/2007 | Kue-hwan | 375/240.16 |
| 2007/0263720 A1* | 11/2007 | He | 375/240.03 |
| 2008/0002773 A1* | 1/2008 | Lai | 375/240.16 |
| 2009/0003447 A1* | 1/2009 | Christoffersen et al. | 375/240.16 |
| 2010/0150240 A1* | 6/2010 | Wahadaniah et al. | 375/240.15 |

FOREIGN PATENT DOCUMENTS

| | | |
|---|---|---|
| JP | 05173613 B | 4/2013 |
| WO | 2006-106935 A1 | 10/2006 |
| WO | 2006-126694 A2 | 11/2006 |

* cited by examiner

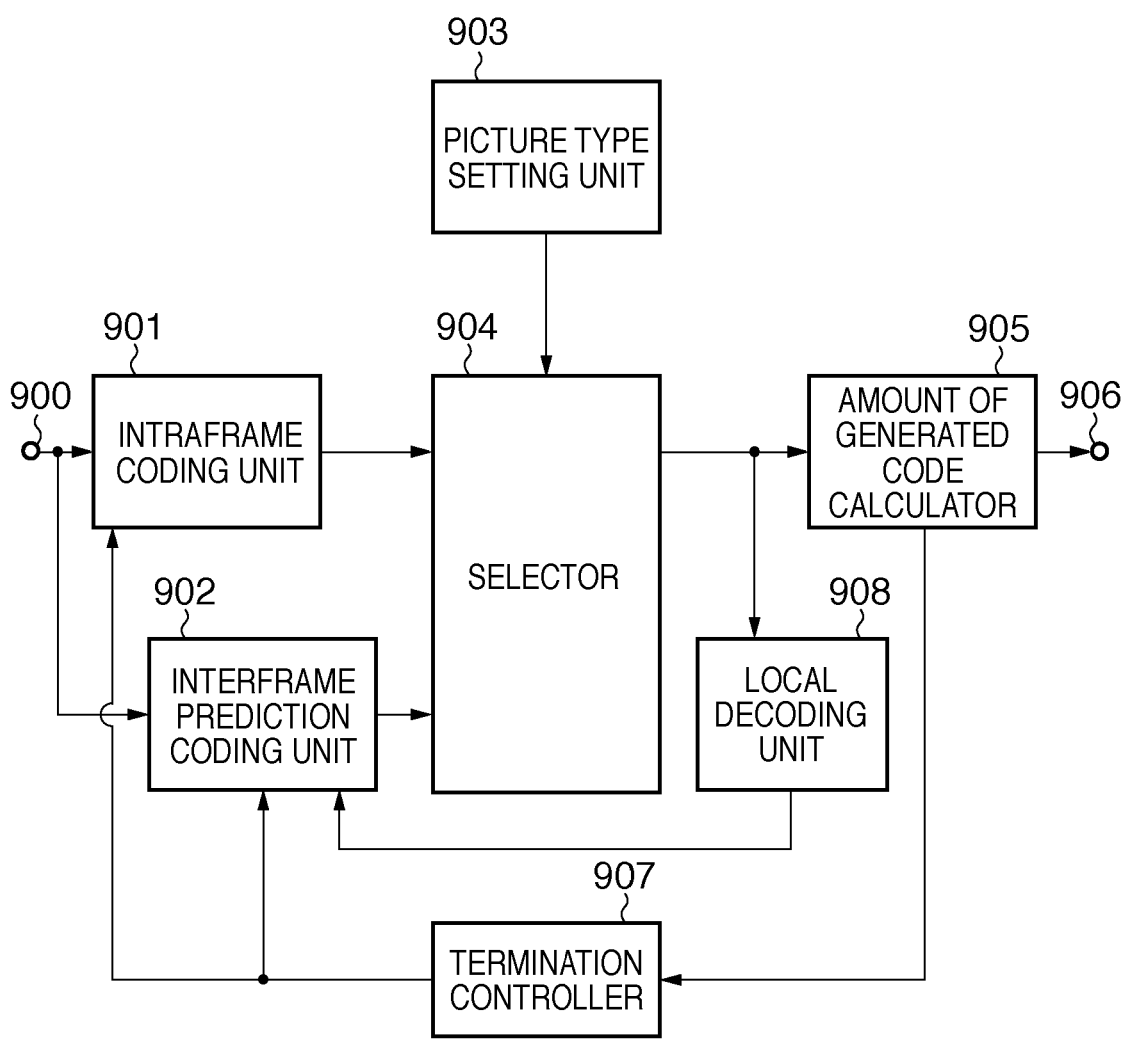
F I G. 6

US 9,300,971 B2

MOVING IMAGE DATA ENCODING APPARATUS CAPABLE OF ENCODING MOVING IMAGES USING AN ENCODING SCHEME IN WHICH A TERMINATION PROCESS IS PERFORMED

CROSS-REFERENCE TO RELATED APPLICATIONS

This application is a national stage application of International Application No. PCT/JP2008/061780, filed Jun. 23, 2008, whose benefit is claimed and which claims the benefit of Japanese Patent Applications No. 2007-175228, filed Jul. 3, 2007 and 2008-148327, filed Jun. 5, 2008, whose benefit is also claimed.

TECHNICAL FIELD

The present invention relates to a moving image data encoding apparatus and a control method for the same, and more particularly, to a moving image data encoding apparatus and a control method for the same for carrying out encoding efficiently.

BACKGROUND ART

Recent advances in digital signal processing technology have made it possible to encode proficiently large amounts of digital information such as moving images as well as still images and audio, to record to compact recording media, to transfer by communication media, and so forth. Adapting this type of technology, development of moving image data encoding apparatuses that can convert television broadcasts and moving images recorded with a video camera into video streams is under way.

As encoding schemes for moving images, MPEG2 and H.264 (also known as AVC) standards are well known. In particular, the H.264 standard, by adopting interframe encoding that can reference to any given picture, achieves compression-encoding of moving images more proficiently than the MPEG2 standard.

However, with H.264, although it allow any given picture to be used as a reference picture, of all the pictures there may be those that are apparently unsuitable as reference pictures. If such pictures can be removed from consideration as references, encoding efficiency could be improved. Thus, for example, in JP-2006-115336-A, an approach is disclosed in which pictures taken with a flash are not used as reference pictures.

At the same time, in H.264, an encoding termination process is sometimes carried out. The following is a detailed description of such encoding termination process.

FIG. 4 is a diagram showing a state of a decoder buffer in which an encoded video stream is stored. When decoding the encoded video stream, in the decoder buffer, as time progresses, the encoded video stream is input at a predetermined rate. By contrast, each time the stream is decoded, an amount of encoded data of the picture that is to be decoded is removed from the decoder buffer. Thus, to ensure that the decoder buffer neither overflows nor underflows, the amount of data that is removed must be correctly controlled. To accomplish such control, the encoded amount of picture must be correctly controlled. For example, in FIG. 4, at a time T the amount of encoded data of picture must not exceed an encoded amount S.

As a means of correctly controlling the picture encoded amount, multi-pass coding, in which encoding of the picture is repeated several times, is used in the creation of video software commercially available for use with DVD players and the like. However, most apparatuses that require encoding in real time, such as a video camera when recording, typically use one-pass coding, in which encoding can only be carried out once. As a result, in a case in which an amount of generated code of a picture is greater than expected, it is necessary to increase the compression rate partway through the picture and keep the encoded amount within a predetermined amount. Specifically, high-frequency components of the video image are drastically cut, drastically reducing the amount of generated code. In the present specification, this process is called an encoding termination process or encoding termination processing.

FIG. 3 is a diagram showing an example of a screen in a case in which a termination process has been performed partway through a picture. FIG. 3 shows an example of decoding results in a case in which encoding is executed sequentially from the upper left of the picture and a termination process is performed roughly halfway through the screen. Although the upper half 301 of the screen is decoded correctly, the lower half 302 is decoded into a block-shaped video image.

If a picture that has been subjected to a termination process as described above is used as a reference picture and interframe prediction coding carried out based on such reference picture, because the correlation of the block-shaped video image portion with the corresponding portion of the picture is very low, compression efficiency decreases sharply and the amount of generated code increases, which is a problem.

DISCLOSURE OF INVENTION

The present invention is conceived in light of the problem described above, and has as one object to provide a moving image data encoding apparatus and a control method for the same that improves encoding efficiency when encoding moving images using an encoding scheme in which a termination process could be performed.

According to an aspect of the present invention, there is provided a moving image data encoding apparatus comprising: an encoding means for encoding pictures that constitute moving image data with encoding schemes that use intraframe coding and interframe prediction coding; a determination means for forcibly terminating encoding of a picture by the encoding means in a case in which an amount of generated code of a picture that is being encoded by the encoding unit exceeds a predetermined value; and a control means for controlling encoding of other pictures to be encoded after a picture whose encoding has been forcibly terminated so that the other pictures do not refer to the picture whose encoding has been forcibly terminated.

According to another aspect of the present invention, there is provided a control method for a moving image data encoding apparatus comprising an encoding unit that encodes pictures that constitute moving image data with encoding schemes that use intraframe coding and interframe prediction coding, the control method comprising: a determination step of forcibly terminating encoding of a picture by the encoding unit in a case in which an amount of generated code of a picture that is being encoded by the encoding unit exceeds a predetermined value; and a control step of controlling encoding of other pictures to be encoded after a picture whose encoding has been forcibly terminated so that the other pictures do not refer to the picture whose encoding has been forcibly terminated.

Further features of the present invention will become apparent from the following description of exemplary embodiments with reference to the attached drawings.

BRIEF DESCRIPTION OF DRAWINGS

FIG. 6 is a block diagram showing one functional configuration example of a moving image data encoding apparatus of the background art.

BEST MODE FOR CARRYING OUT THE INVENTION

Figure 1:
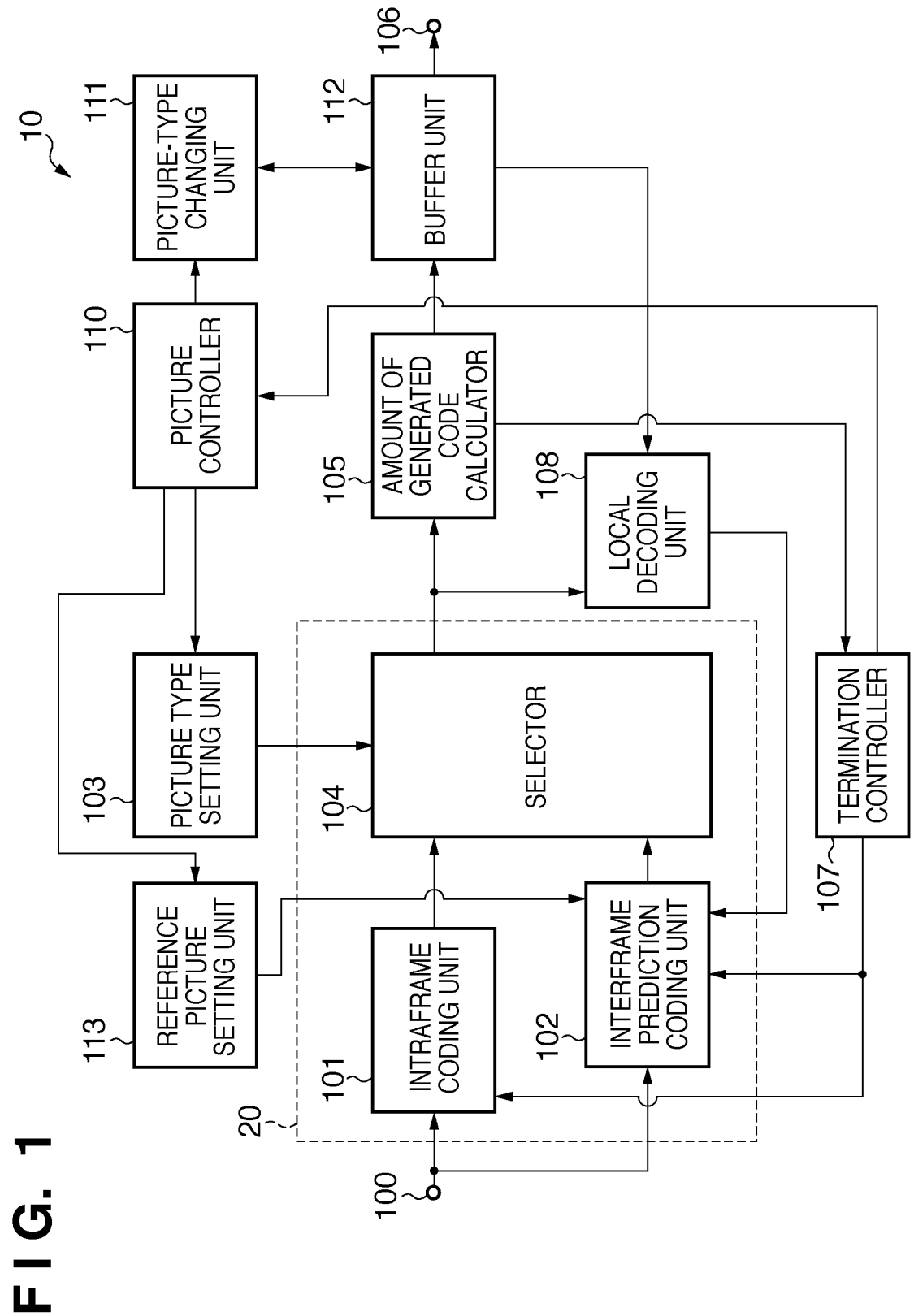
FIG. 1 is a block diagram showing one functional configuration example of a moving image data encoding apparatus of embodiments of the present invention.

Preferred embodiments of the present invention will now be described in detail in accordance with the accompanying drawings.

(First Embodiment)

FIG. 6 is a block diagram showing one functional configuration example of a moving image data encoding apparatus of the background art.

In FIG. 6, reference numeral 900 designates an input unit and 901 designates an intraframe coding unit. In addition, reference numeral 902 designates an interframe prediction coding unit and 903 designates a picture type setting unit. Further, reference numeral 904 designates a selector and 905 designates an amount of generated code calculator. Additionally, reference numeral 906 designates a video stream output unit and 907 designates a termination controller. Reference numeral 908 designates a local decoding unit.

Video signals (moving image data) input to the input unit number 900 are supplied to either the intraframe coding unit 901 or to the interframe prediction coding unit 902, respectively. The intraframe coding unit 901, using spatial correlation between the pictures that constitute the video image, carries out encoding of each picture independently, one picture (frame) at a time, without referring to other pictures. In standards based on ISO/IEC13818-2 or standards based on ITU-T H.264, an image encoded using this type of encoding scheme is defined as an I picture (also called an intraframe coding picture or I slice).

By contrast, the interframe prediction coding unit 902 carries outs encoding using similarity between pictures with different display times, that is, temporal correlation. In the above-described standards, an image encoded using this type of encoding scheme is defined as a P picture (also called an interframe forward prediction coding picture or P slice) or a B picture (also called a bi-directional predictive-picture or B slice). In addition, when carrying out interframe prediction coding, the picture that is to be the reference with respect to the picture that is to be encoded is called a reference picture. The reference picture is not the input image itself but a decoded image consisting of an encoded picture that has already been encoded which has been locally decoded by the local decoding unit 908. Use of this reference picture prevents propagation of degradation error.

The picture type setting unit 903 instructs the selector 904 as to the type of picture as indicated by the I, P, or B described above. In a case in which the instructed picture type is the type (I) picture encoded by the intraframe coding scheme, the selector 904 selects the intraframe prediction coding unit 901 and supplies encoded data encoded by the intraframe prediction coding unit 901 to the amount of generated code calculator 905. On the other hand, in a case in which the instructed picture type is the type (P or B) encoded by the interframe prediction coding scheme, the selector 904 selects the interframe prediction coding unit 902 and supplies encoded data encoded by the interframe prediction coding unit 902 to the amount of generated code calculator 905.

The amount of generated code calculator 905 outputs a stream of encoded data supplied from the selector 904 to the video stream output unit 906, and at the same time calculates an accumulated value of the amount of encoded data (amount of generated code). Then, where the accumulated value exceeds a predetermined value, the termination controller 907 accepts the accumulated value calculated by the amount of generated code calculator 905 and transmits a termination instruction signal to either the intraframe coding unit 901 or the interframe prediction coding unit 902.

FIG. 1 is a block diagram showing one functional configuration example of a moving image data encoding apparatus according to embodiments of the present invention.

A moving image data encoding apparatus 10 includes an input unit 100, an intraframe coding unit 101, an intraframe prediction coding unit 102, a picture type setting unit 103, and a selector 104. It should be noted that, the intraframe coding unit 101, the interframe prediction coding unit 102, and the selector 104 are collectively referred to as an encoding unit 20. In addition, the moving image data encoding apparatus 10 also includes an amount of generated code calculator 105, a video stream output unit 106, a termination controller 107, and a local decoding unit 108. In the present embodiment, the moving image data encoding apparatus 10 further includes a picture controller 110, a picture-type changing unit 111, a buffer unit 112, and a reference picture setting unit 113. The various components of the moving image data encoding apparatus 10 are controlled by a microcomputer, not shown.

Video signals (moving image data) input to the input unit 100 are supplied to the intraframe coding unit 101 and the interframe prediction coding unit 102, respectively. The intraframe coding unit 101, using the spatial correlation between the pictures that constitute the moving image data, carries out encoding of each picture independently, one picture (frame) at a time. In standards based on ISO/IEC13818-2 or standards based on ITU-T H.264, an image encoded using this type of encoding scheme is defined as an I picture (also called an intraframe coding picture or I slice).

By contrast, the interframe prediction coding unit 102 carries outs encoding using the similarity between pictures with different display times, that is, temporal correlation. In the above-described standards, an image encoded using this type of encoding scheme is defined as a P picture (also called an interframe forward prediction coding picture or P slice) or a B picture (also called a bi-directional predictive-picture or B slice). In addition, when carrying out interframe prediction coding, the picture that is to be the reference with respect to the picture that is to be encoded is called a reference picture. The reference picture is not the input image itself but a decoded image consisting of an encoded picture that has already been encoded which has been locally decoded by the local decoding unit 108. It should be noted that the reference picture data is stored in multiple frames in a frame memory provided in the interframe prediction coding unit 102. Use of this reference picture in interframe prediction coding prevents propagation of degradation error.

The picture type setting unit 103 instructs the selector 104 as to the type of picture as indicated by the I, P, or B described above. In a case in which the instructed picture type is the type (I) picture encoded by the intraframe coding scheme, the selector 104 selects the intraframe prediction coding unit 101 and supplies encoded data encoded by the intraframe prediction coding unit 101 to the amount of generated code calculator 105. On the other hand, in a case in which the instructed picture type is the type (P or B) encoded by the interframe prediction coding scheme, the selector 104 selects the interframe prediction coding unit 102 and supplies encoded data encoded by the interframe prediction coding unit 102 to the amount of generated code calculator 105.

The amount of generated code calculator 105 outputs to the buffer unit 112 the encoded data supplied from the selector 104, and also calculates the accumulated value for the amount of encoded data (amount of generated code). Then, in a case in which the accumulated value exceeds a predetermined value, the termination controller 107 accepts the amount of generated code calculated by the amount of generated code calculator 105 and transmits a termination instruction signal to the intraframe coding unit 101 or to the interframe prediction coding unit 102. Further, the termination controller 107 also transmits a termination instruction signal to the picture controller 110 as well. The termination instruction signal is information indicating that encoding for a picture has been forcibly terminated, as well as indicating at which number picture has encoding been forcibly terminated.

Figure 5A:
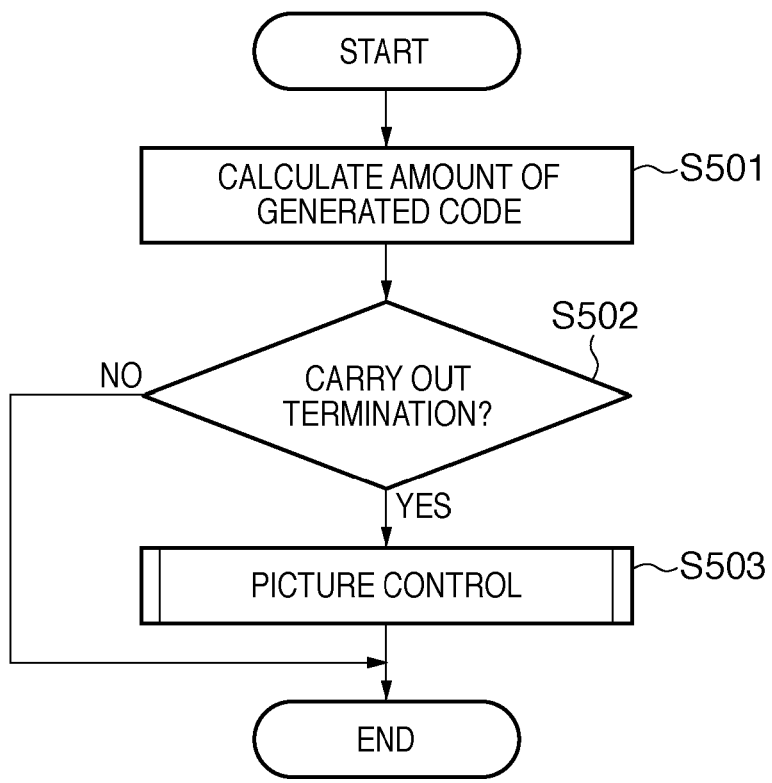
FIGS. 5A and 5B are flow charts illustrating one example of a processing procedure in embodiments of the present invention from termination processing to changing a reference picture.
Figure 5B:
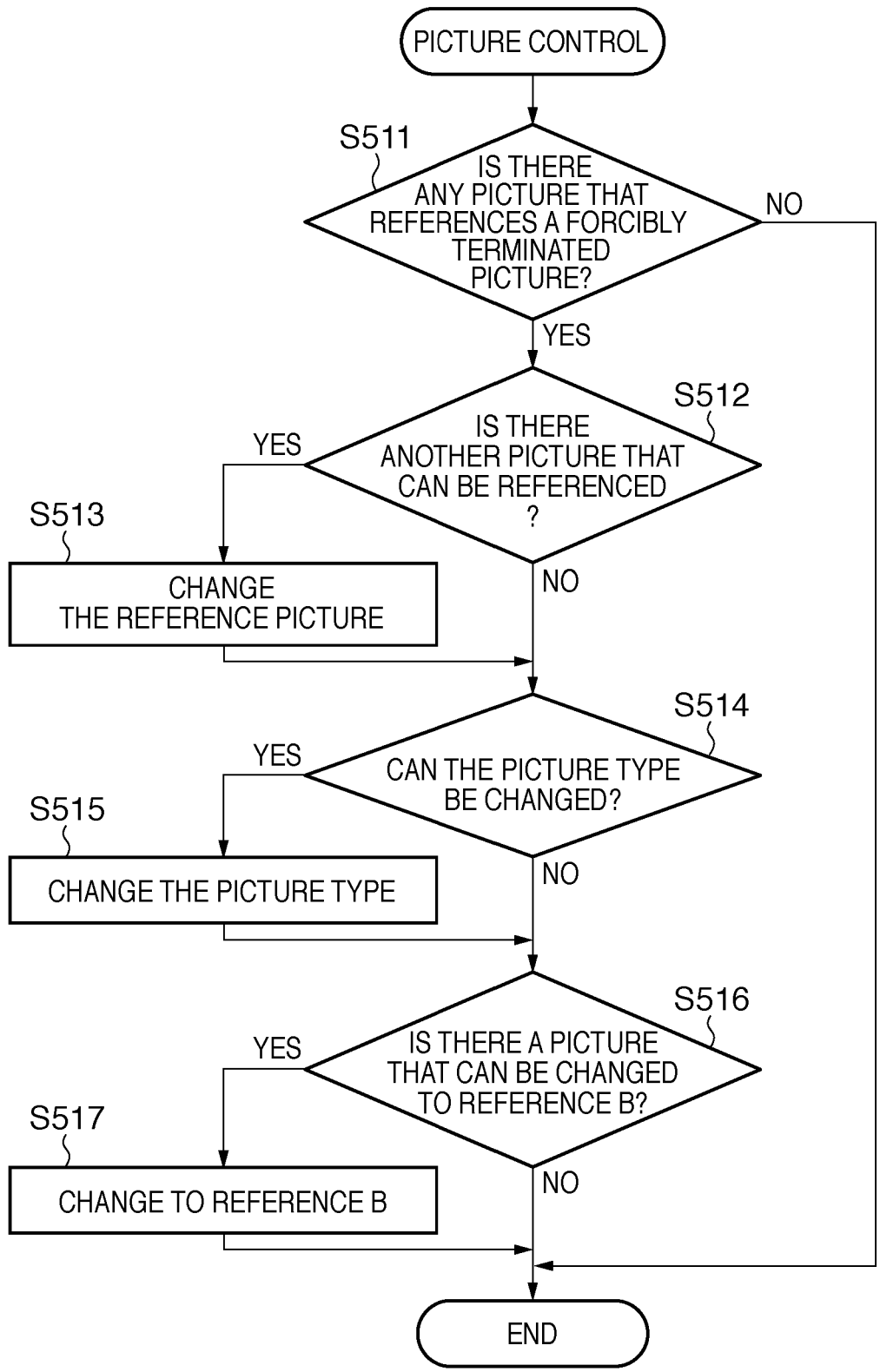

FIGS. 5A and 5B are flow charts illustrating one example of a procedure according to an encoding termination process and an encoding control process attendant thereupon in the present embodiment, specifically, controlling encoding of other pictures so that, when encoding of an I picture or a P picture is forcibly terminated, such other pictures to be encoded after the picture whose encoding has been forcibly terminated do not refer to an I or a P picture whose encoding has been forcibly terminated.

First, in step S501, the amount of generated code calculator 105 outputs encoded data supplied from the selector 104 to the video stream output unit 106 via the buffer unit 112, and at the same time calculates an accumulated value for the amount of encoded data (amount of generated code). Next, in step S502, the amount of generated code calculator 105 compares the calculated accumulated value with a predetermined value, and determines whether or not to carry out an encoding termination process partway through encoding of an I picture or a P picture. Specifically, where the accumulated value exceeds the predetermined value, the amount of generated code calculator 105 determines to carry out termination processing (the forcible termination). As a result of this determination, in a case in which it is determined to not carry out termination processing, the termination controller 107 does not transmit a termination instruction signal to the intraframe coding unit 101 or the interframe prediction coding unit 102, and to the picture controller 110.

By contrast, in a case in which, as a result of the determination made in step as S502, it is determined to carry out termination processing, the process proceeds to step S503. Then, in step S503, the termination controller 107 accepts the accumulated value from the amount of generated code calculator 105 and transmits a termination instruction signal to the intraframe coding unit 101 or the interframe prediction coding unit 102, an furthermore transmits a termination instruction signal to the picture controller 110 as well. The picture controller 110, having received the termination instruction signal, accepts the accumulated value from the amount of generated code calculator 105 and transmits a control signal to the picture type setting unit 103 and forcibly changes the following picture's picture type so as not to refer to the picture whose encoding has been forcibly terminated. Alternatively, the picture controller 110 transmits a control signal to the reference picture setting unit 113 and the picture-type changing unit 111, and forcibly changes so that a previously encoded picture saved in the buffer unit 112 is the reference picture. A further description of this picture control attendant upon termination of encoding in step S503 is given below using the flow chart shown in FIG. 5B and FIGS. 2A-2D, which show an example of relations between referencing picture and referenced picture.

Figure 2A:
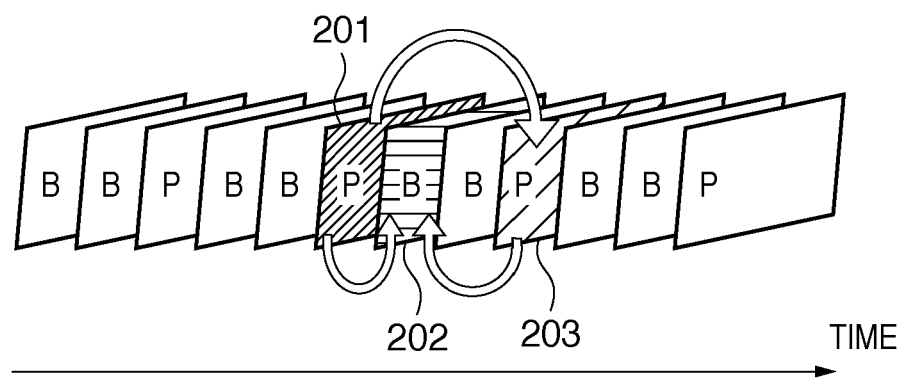
FIGS. 2A through 2D are diagrams showing one example of relations between referencing picture and referenced picture.
Figure 2B:
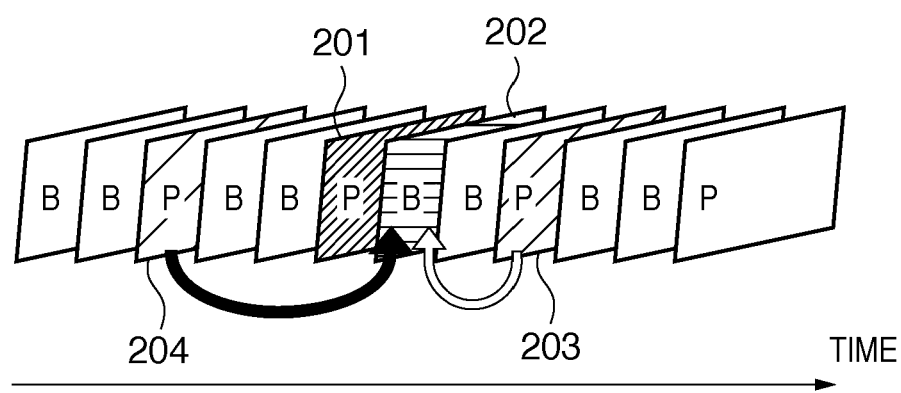
Figure 2C:
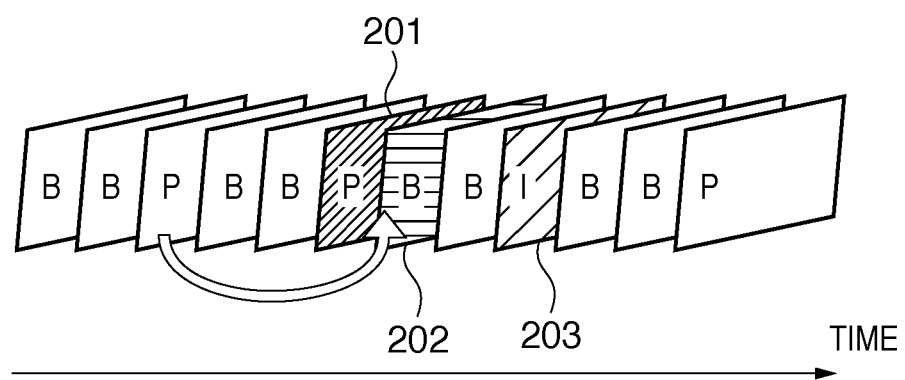
Figure 2D:
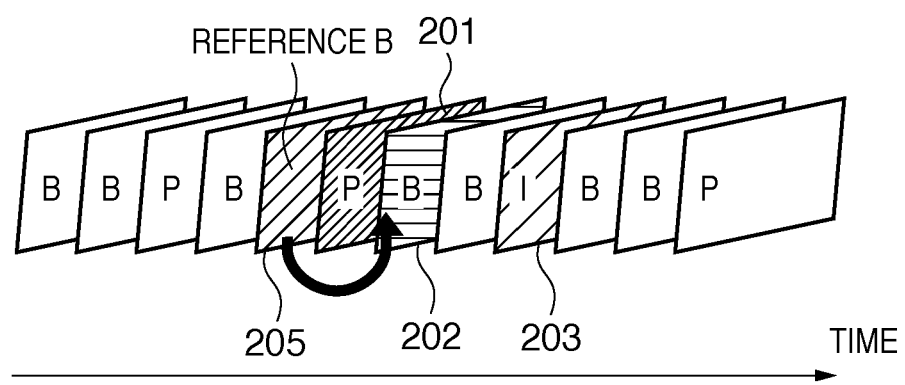
Figure 3:
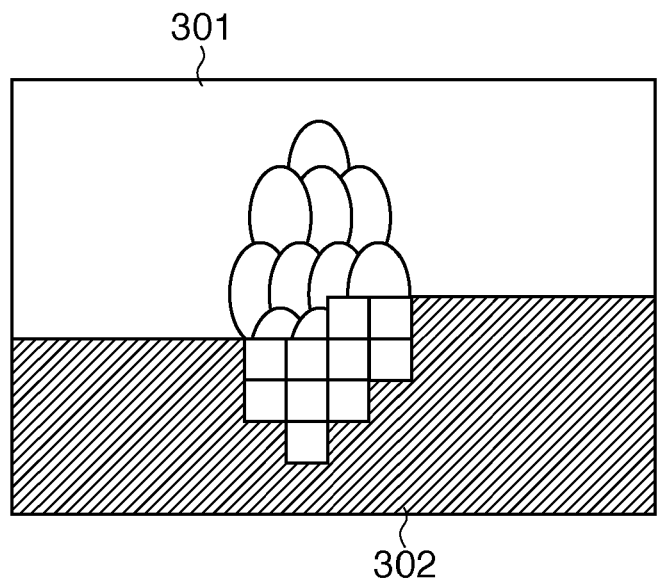
FIG. 3 is a diagram showing degradation of a picture due to termination processing.
Figure 4:
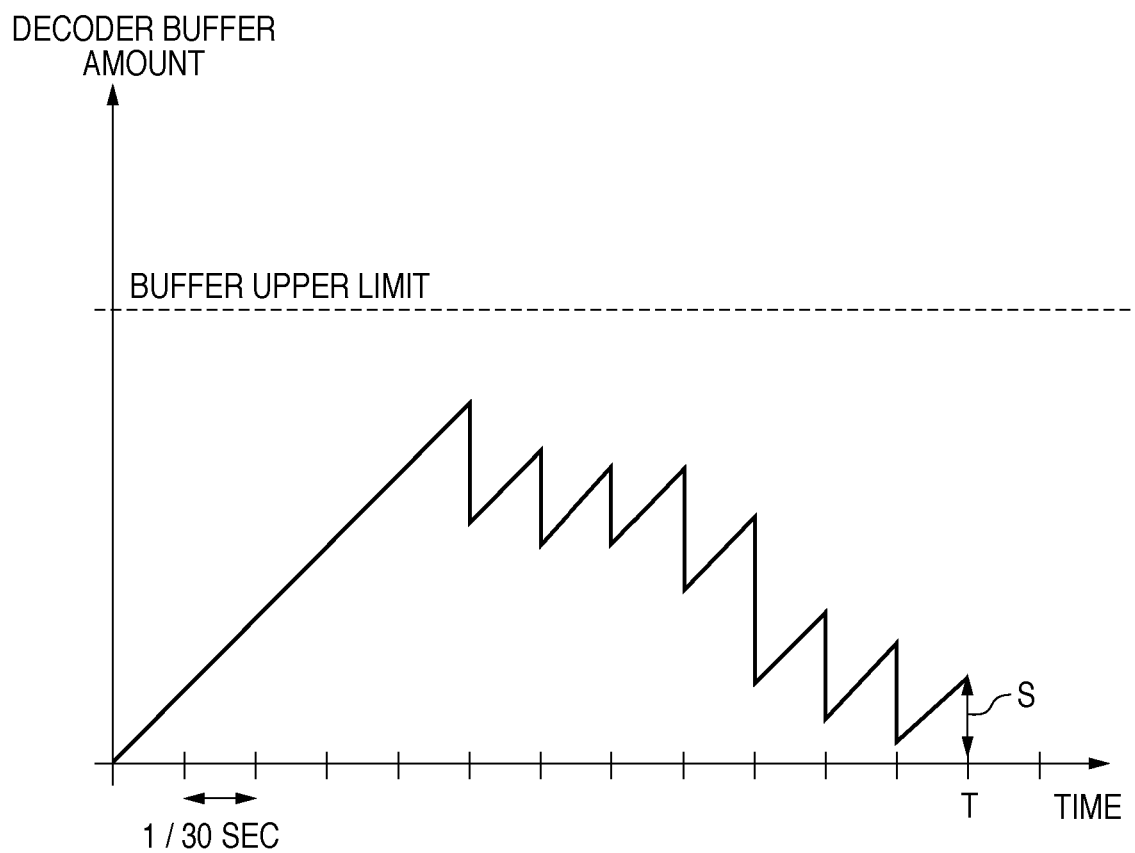
FIG. 4 is a diagram illustrating changes in accumulated amount in a decoder buffer.

FIGS. 2A-2D show one example of relations between referencing picture and referenced picture. It should be noted that FIG. 2A shows relations between referencing picture and referenced picture in a case in which a termination process is not performed, and FIGS. 2B-2D show relations between referencing picture and referenced picture in a case in which a termination process is performed.

In a line of pictures like that shown in FIG. 2A, in a case in which termination processing is not performed, a second picture 202 and a third picture 203 reference a first picture 201. However, if a termination process is performed at the first picture 201, and the second picture 202 and the third picture 203 reference this greatly degraded first picture 201, temporal correlation declines and encoding efficiency decreases.

In step S511, the picture controller 110 determines whether or not a picture to be encoded refers to a picture of which encoding has been forcibly terminated. This determination may be carried out on the basis of the picture type that is to be set for the picture that is to be encoded and information on the picture whose encoding has been forcibly terminated that was stored on the basis of the accumulated value accepted when the amount of generated code calculator 105 decided to execute termination processing.

Subsequently, in a case in which they sure that is to be encoded rehearsed to a picture whose encoding has been forcibly terminated, by either (1) changing the reference picture or (2) changing the picture type of the picture to be encoded, the picture to be encoded does not reference the picture whose encoding has been forcibly terminated.

In the case of the example shown in FIG. 2A, the picture controller 110, in S511, detects that the second picture 202 references the first picture 201 at which a termination process has been performed.

Then, the picture controller 110, at S512, determines whether or not there are other pictures that the second picture 202 can reference.

In the example shown in FIG. 2B, a case is shown in which the picture controller 110 determines that, in place of the first picture, a fourth picture 204 that is the same picture type (P) as the first picture and that comes before the first picture 201 temporally can be referenced.

In this case, in step S513, the picture controller 110 sends a control signal to the reference picture setting unit 113 so that the second picture 202 references the fourth picture 204, in accordance with which the reference picture setting unit 113 changes the reference picture for the second picture 202 from the first picture 201 to the fourth picture 204. This change can be carried out by changing the reference picture ID. The interframe prediction coding unit 102 acquires the decoding results of the forth picture 204 from the local decoding unit 108 and encodes the second picture 202.

In a case in which the picture controller 110 determines in step S512 that there is no other picture that can be referenced, in S514 the picture control or 110 determines whether or not is the picture type of the picture to be encoded can be changed to an intraframe coding I picture.

If the picture type can be changed, in S515 the picture controller 110 sends a control signal to the picture type setting unit 103 and forcibly changes the picture type to an I picture. For example, in the example shown in FIG. 2A, assume that in S512 it is determined in that there is no other picture that the third picture 203 (P picture) can reference. In addition, assume that the third picture 203 can be changed to an I picture. Accordingly, as shown in FIG. 2C the picture type of the third picture 203 is forcibly changed to an interframe coding scheme picture (an I picture). In other words, encoding of the third picture 203 is carried out by the intraframe coding unit 101.

In a case in which there is no other picture that can be referenced and the picture type cannot be changed, the picture controller 110, in step S516, searches for an encoded picture whose encoding has not been forcibly terminated being saved in the buffer unit 112. It goes without saying that at this time a search is made for a picture that is temporally close to the picture to be encoded. Then, of the pictures obtained by the search, is determined whether or not a particular picture is a picture that has not been referenced (that is, a non-referenced picture) and which can be changed to a referenced picture.

Here, for convenience, in the example shown in FIG. 2A, assume that the second picture 202 is picture that has no other picture that can be referenced and whose picture type cannot be changed. Then, assume that an immediately preceding fifth picture 205, which is a B picture, is a non-reference picture and moreover can be changed to a reference picture.

In this case, the picture controller 110, in step S517, sends a control signal to the picture-type changing unit 111 and forcibly changes the picture type of the preceding picture. In the example shown in FIG. 2D, the fifth picture 205 is not used as a reference picture and is encoded as a B picture. However, since the first picture 201 has been subjected to termination processing, the picture controller 110 changes the code showing the picture type in the encoded video stream being saved in the buffer unit 112. As a result, the second picture 202 can reference the fifth picture 205 instead of the first picture 201. In this manner, a B picture, which should have referenced the first picture 201, in the interval during which encoding is carried out, references a picture other than a picture whose encoding has been forcibly terminated.

By so doing, pictures the quality of which has been degraded by termination are limited to just the terminated first picture 201, such that, in the encoding of the succeeding pictures such as the second picture 202 and the third picture 203, the picture type and the reference picture are changed. Therefore, a picture having temporal correlation can be referenced and coding efficiency can be improved.

It should be noted that the method of determination in steps S512, S514, and S516 may be determined as convenient. Moreover, the order of priority of the determinations and processes need not be the order shown in FIG. 5B.

In the present embodiment, when encoding so as to reference a picture for which termination of encoding has occurred as shown in the flow chart of FIG. 5B, first, it is determined whether or not there is another reference picture whose encoding has not been forcibly terminated in the frame memory in the interframe prediction coding unit 102. Then, if such other reference picture is suitable for prediction, the process of S513 is carried out. On the other hand, if there is no reference picture suitable for prediction in the frame memory, it is determined whether or not the picture that is to be encoded can be changed to an I picture. If the picture can be changed to an I picture, then the process of S515 is carried out. If the picture cannot be changed to an I picture, then it is determined whether or not an encoded B picture that can be changed to a reference B picture remains in the buffer unit 112. If there is a picture that can be changed to a reference B picture, the process of S517 is carried out. It should be noted that, if none of these determination criteria is satisfied, coding may also be carried out using as is the picture whose encoding has been forcibly terminated.

It should be noted that the order of priority of the determination criteria described above is one example of an embodiment. Processing may be added so that another order of priority may be adopted or the order of priority may be changed as convenient, for example by restricting the Group of Picture (GOP) structure or by restricting the amount of code.

It should be noted that although in the present embodiment an example is given of a moving image data encoding apparatus that inputs video signals from the input unit 100, the present invention is equally applicable to an image sensing apparatus further including an image sensing unit that photographs a subject for conversion into video signals.

As described above, the present embodiment does not treat a picture heavily degraded by termination processing as a reference picture, and therefore temporal correlation can be kept high and encoding can be carried out efficiently.

(Other Embodiments According to the Present Invention)

The means that constitute the moving image data encoding apparatus of the embodiments of the present invention described above, as well as the steps of the moving image data encoding schemes, can be implemented by a program stored in a RAM or ROM of a computer. The program, as well as a computer-readable recording medium storing the program, is within the scope of the present invention.

In addition, embodiments of the present invention as, for example, a system, an apparatus, a program, or a recording medium, are also possible. In particular, the present invention is equally applicable to a system composed of multiple devices or to an apparatus composed of a single device.

It should be noted that the present invention also includes a case in which a software program for implementing the functions of the above-described embodiments (a program corresponding to the flow chart shown in FIG. 5) is supplied directly or indirectly to the system or apparatus, with the invention also achieved by the system or apparatus computer reading out and executing the supplied program code.

Therefore, a computer program code installed in a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium like such as CD-ROM, distribute the storage medium to users, allow users who meet certain requirements to download decryption key data from a website via the Internet, and allow these users to decrypt the encrypted program by using the key data, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-175228 filed on Jul. 3, 2007, and No. 2008-148327 filed on Jun. 5, 2008, which are hereby incorporated by reference herein in their entirety.

The invention claimed is:

1. An image sensing apparatus comprising:
   an image sensing unit that generates moving image data by using an image sensor;
   a memory that stores program instructions; and
   at least one processor that executes instructions stored in the memory, wherein the instructions cause, when executed, the at least one processor to encode pictures that constitute moving image data with encoding schemes that use intraframe coding and interframe prediction coding, and generate encoded picture and a locally decoded picture,
   wherein the locally decoded picture is stored in a frame memory that stores a plurality of locally decoded pictures as candidates of a reference picture used in the interframe prediction coding,
   wherein the at least one processor, during coding a picture, performs an encoding termination process that drastically reduces an amount of generated code from spatially partway in a picture being encoded by drastically cutting high-frequency components of the picture, in a case in which the amount of already generated code of the picture exceeds a first predetermined value, so that a total amount of code generated for the entire picture is within a second predetermined value, and
   wherein when a picture is going to be encoded with interframe prediction coding, and the termination process has been performed on a predetermined reference picture that is one of the locally decoded pictures stored in the frame memory and has initially been assigned to be used as a reference picture in the interframe prediction coding of the picture, the at least one processor selects another locally decoded picture, on which the termination process has not been performed, from the locally decoded pictures stored in the frame memory, to be used as an alternative of the predetermined reference picture.

2. The image sensing apparatus according to claim 1, further comprising:
   an image memory that stores the previously encoded pictures; and
   wherein the encoding unit changes a picture type of the selected previously encoded picture stored in the image memory if the selected previously encoded picture has a picture type not to be used as a reference picture.

3. A control method for an image sensing apparatus comprising:
   an image sensing step that generates moving image data by using an image sensor;
   a storing step that stores, in a memory, program instructions;
   an encoding step that executes, by a processor, instructions stored in the memory, wherein the instructions cause, when executed, the processor to encode pictures that constitute moving image data with encoding schemes that use intraframe coding and interframe prediction coding, and generate an encoded picture and a locally decoded picture;
   wherein the locally decoded picture is stored in a frame memory that stores a plurality of locally decoded pictures as candidates of a reference pictures used in the interframe prediction coding,
   wherein the processor, during coding a picture, performs an encoding termination process that drastically reduces an amount of generated code from spatially partway in a picture being encoded by drastically cutting high-frequency components of the picture, in a case in which the amount of already generated code of the picture exceeds a first predetermined value, so that a total amount of code generated for the entire picture is within a second predetermined value, and
   wherein when a picture is going to be encoded with interframe prediction coding, and the termination process has been performed on a predetermined reference picture that is one of the locally decoded pictures stored in the frame memory and has initially been assigned to be used as a reference picture in the interframe prediction coding of the picture, the processor selects another locally decoded picture, on which the termination process has not been performed, from the locally decoded pictures stored in the frame memory, to be used as an alternative of the predetermined reference picture.

4. The control method for an image sensing apparatus according to claim 3, further comprising an image storing step that stores, in an image memory, the previously encoded pictures,
   wherein the encoding step changes a picture type of the selected previously encoded picture stored in the image storing step if the selected previously encoded picture has a picture type not to be used as a reference picture.

5. A control method for an image sensing apparatus comprising:
an image sensing step that generates a moving image data by using an image sensor;
a storing step that stores, in a memory, program instructions;
an executing step that executes, by a processor, instructions stored in the memory, wherein the instructions cause, when executed, the processor to implement functions of an encoding unit;
an encoding step that encodes, by an encoding unit, pictures that constitute moving image data with encoding schemes that use intraframe coding and interframe prediction coding, and generates an encoded picture and a locally decoded picture;
wherein the locally decoded picture is stored in a frame memory that stores a plurality of locally decoded pictures as candidates of a reference pictures used in the interframe prediction coding,
wherein the encoding step, during coding a picture, performs an encoding termination process that drastically reduces an amount of generated code from spatially partway in a picture being encoded by drastically cutting high-frequency component of the picture, in a case in which the amount of already generated code of the picture exceeds a first predetermined value, so that a total amount of code generated for the entire picture is within a second predetermined value, and
wherein when a picture is going to be encoded with interframe prediction coding, and the termination process has been performed on a predetermined reference picture that is one of the locally decoded pictures stored in the frame memory and has initially been assigned to be used as a reference picture in the interframe prediction coding of the picture, the processor selects another locally decoded picture, on which the termination process has not been performed, from the locally decoded pictures stored in the frame memory, to be used as an alternative of the predetermined reference picture.

6. A moving image data encoding apparatus having at least one processor and a memory, which is coupled to the at least one processor and includes instructions executed by the at least one processor, the instructions cause the at least one processor to implement:
an encoding unit that encodes pictures that constitute moving image data with encoding schemes that use intraframe coding and interframe prediction coding, and generates encoded picture and a locally decoded picture;
wherein the locally decoded picture is stored in a frame memory that stores a plurality of locally decoded pictures as candidates of a reference pictures used in the interframe prediction coding,
wherein the at least one processor encoding unit, during coding a picture, performs an encoding termination process that drastically reduces an amount of generated code from spatially partway in a picture being encoded by drastically cut cutting high-frequency components of the picture, in a case in which the amount of already generated code of the picture exceeds a first predetermined value, so that a total amount of code generated for the entire picture is within a second predetermined value, and
wherein when a picture is going to be encoded with interframe prediction coding, and the termination process has been performed on a predetermined reference picture that is one of the locally decoded pictures stored in the frame memory and has initially been assigned to be used as a reference picture in the interframe prediction coding of the picture, the at least one processor selects another locally decoded picture, on which the termination process has not been performed, from the locally decoded pictures stored in the frame memory, to be used as an alternative of the predetermined reference picture.

7. The image sensing apparatus according to claim 1, wherein when a picture is going to be encoded with interframe prediction coding, and the termination process has been performed on the predetermined reference picture, the at least one processor selects one of the locally decoded pictures as the alternative of the predetermined reference picture, without changing a picture type of the picture to be encoded.

8. The control method for an image sensing apparatus claim 3, wherein when a picture is going to be encoded with interframe prediction coding, and the termination process has been performed on the predetermined reference picture, the at least one processor selects one of the locally decoded pictures as the alternative of the predetermined reference picture, without changing a picture type of the picture to be encoded.

* * * * *